July 12, 1927.

R. DHUME ET AL 1,635,359

CHECK ROW PLANTER

Filed April 30, 1925

Inventor
Ross Dhume and
Roy Dhume.

By Mason Fenwick & Lawrence
Attorneys

Patented July 12, 1927.

1,635,359

UNITED STATES PATENT OFFICE.

ROSS DHUME AND ROY DHUME, OF COLUMBUS, OHIO, ASSIGNORS OF ONE-THIRD TO GEORGE W. WALKER, OF COLUMBUS, OHIO.

CHECKROW PLANTER.

Application filed April 30, 1925. Serial No. 27,035.

This invention relates to improvements in check row corn planters, particularly to an improvement that may be used on or adapted to any suitable corn planter and check or drill, thereby doing away with the greater portion of machinery parts now common to most planters.

The primary object of this invention is to provide accurate and simple means whereby an operator may start at any distance from the end of the row and never lose the check by merely working a lever and indicator. The indicator will accurately show where each hill of corn was planted so as to give no trouble in starting the next row at any point desired.

Figure 1:
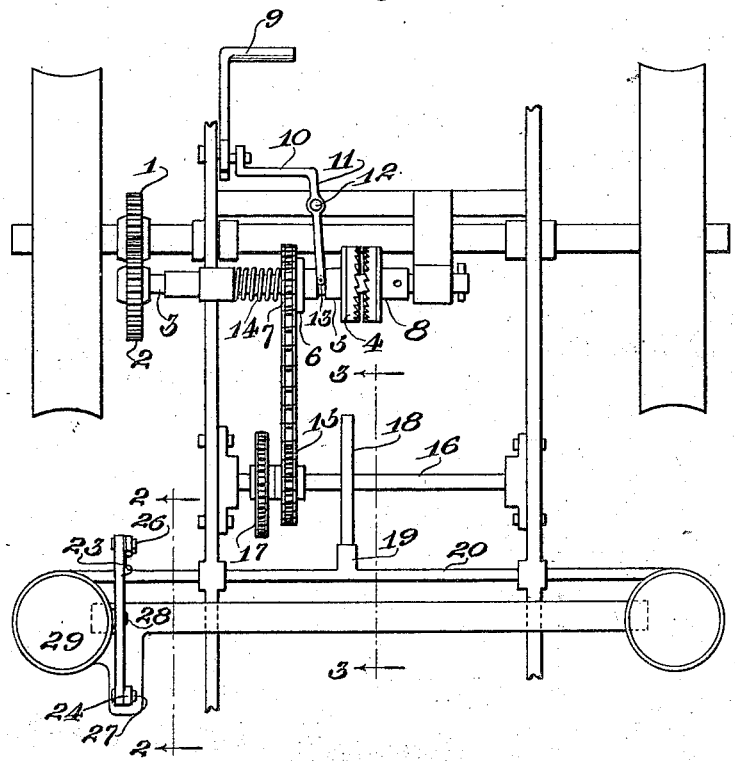
Fig. 1 illustrates a plan view of the device in assembled form as attached to an ordinary corn planter.
Figure 2:
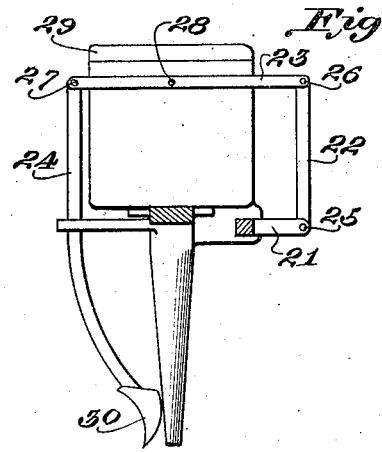
Fig. 2 shows a vertical section view of one of the seed containers and chute at one side of the planter, in relation to the actuating lever arms adapted to operate the indicator shoe, taken on line 2—2 of Fig. 1.
Figure 3:
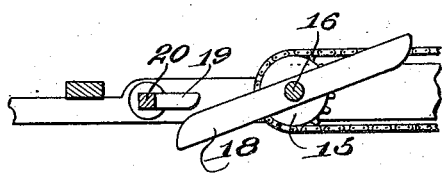
Fig. 3 represents an end sectional view of Fig. 1 taken on line 3—3.

Numeral 1, designates a driving gear fastened to an axle of an ordinary planter, and is adapted to drive a gear 2 attached to an intermediate shaft 3, rotatably mounted at a suitable point on the planter frame, and having at one end thereof, a suitable clutch consisting of a toothed portion 4, a sleeve portion 5, and a flanged section 6, adapted to be securely fastened to a sprocket wheel 7. The co-acting portion 8, of the clutch is keyed or otherwise connected with the shaft 3, so that it will revolve at all times with the intermediate gear 2. The sliding clutch portion 4, is adapted to be disengaged by means of a foot bell crank 9, having connecting levers 10 and 11, and pivoted at point 12 on the planter frame, the crank being attached to the clutch sleeve at 13, in such a manner that when the foot lever or crank 9 is pressed or operated the clutch becomes disengaged, and the sprocket gear 7 rides free. When the pressure is released from the crank the clutch becomes engaged through the energy exerted by a tension spring 14, on the spindle 3, thereby connecting the clutch elements to drive the sprocket chain and wheel 15 which is keyed to a shaft 16 suitably and rotatably mounted on the planter frame. The shaft 16 is designed to carry in keyed relation thereto, a circular disk 17, having projections circumferentially placed adapted for drilling, and also a trip lever 18, pivoted at its centre point to the shaft 16, so that in revolving the lever 18 will, twice in each revolution, more or less as desired, trip the lug 19, which is fastened to the lever rod, 20; for convenience the rod 20 may be made square, and have locked to it a crank arm 21, which in turn is linked to a series of lever arms 22, 23 and 24, these arms being loosely pinned at 25, 26 and 27, the arm 23 being pivoted at 28 on the seed container 29, in such a manner, that when lug 19 is tripped by lever 18, the indicator shoe 30, will function.

In operation this invention may be used on any corn planter, and without check row wire.

What we claim is:

A planting and marking machine including a supporting frame having a hopper mounted thereon, a member pivoted intermediate its ends on said hopper, a rod mounted for oscillation on said frame, an arm extending radially from and fixed to said rod, a link pivoted at one of its ends to said arm and having its other end pivoted to the other end of said member and of such length as to maintain said arm and said member substantially parallel to each other in their various positions and a marking rod parallel to said link and slidable vertically in said frame and pivoted at one of its ends to other end of said member.

In testimony whereof we affix our signatures.

ROSS DHUME.
ROY DHUME.